United States Patent [19]
Zachystal

[11] Patent Number: 4,884,465
[45] Date of Patent: Dec. 5, 1989

[54] DEVICE FOR OBTAINING A DIRECTIONAL CENTRIFUGAL FORCE

[76] Inventor: George J. Zachystal, 844 Robinson St., Regina, Saskatchewan, Canada, S4T 2M3

[21] Appl. No.: 142,446

[22] Filed: Jan. 11, 1988

[51] Int. Cl.⁴ .......................................... F16H 33/20
[52] U.S. Cl. .................................. 74/84 R; 74/86; 74/87
[58] Field of Search .................. 74/84 R, 84 S, 86, 87

[56] References Cited

U.S. PATENT DOCUMENTS

| | | | |
|---|---|---|---|
| 2,350,248 | 5/1944 | Nowlin | 74/61 |
| 3,555,915 | 1/1971 | Young Jr. | 74/84 S |
| 3,584,515 | 6/1971 | Matyas | 74/84 |
| 3,750,484 | 8/1973 | Benjamin | 74/84 S |
| 3,810,394 | 5/1974 | Novak | 74/87 |
| 3,968,700 | 7/1976 | Cuff | 74/84 S |

FOREIGN PATENT DOCUMENTS

| | | | |
|---|---|---|---|
| 704568 | 3/1965 | Canada | 74/84 S |
| 68304 | 4/1958 | France | 74/87 |

Primary Examiner—Leslie A. Braun
Assistant Examiner—Scott Anchell
Attorney, Agent, or Firm—Murray E. Thrift; Stanley G. Ade; Adrian D. Battison

[57] ABSTRACT

A device for obtaining a directional force from a rotary motion has a frame rotating about a longtiudinal axis at a selected angular speed. A weight is connected to the frame and rotates about a transverse axis at the same angular speed. When the weight has transversed 180°, the frame itself will have rotated through 180°, so that the weight will return to its original position on the same side of the apparatus as it transversed in the first half cycle. The resultant centrifugal forces all act to one side of the apparatus, producing a unidirectional thrust.

6 Claims, 2 Drawing Sheets

DEVICE FOR OBTAINING A DIRECTIONAL CENTRIFUGAL FORCE

FIELD OF THE INVENTION

The present invention relates to a device for obtaining a directional force from a rotary motion.

BACKGROUND

Various devices have been proposed in the past for converting rotary motion into a unidirectional or linear motion. These include the devices described in U.S. Pat. No. 2,350,248, 3,584,515, 3,810,394, 3,750,484 and 3,968,700. These all tend to be complex devices, often employing one or more linearly moving weights.

The objective of the present invention is to provide simple device of this nature employing purely rotary motion.

SUMMARY OF THE INVENTION

According to the present invention there is provided a device for obtaining a directional force from rotatory motion, comprising:
a frame;
means for rotating said frame about a first axis at a selected angular speed;
a weight; means for rotating said weight with respect to said frame about a second axis at said selected angular speed, said second axis being perpendicular to said first axis and said weight being eccentrically located with respect to said second axis.

As the eccentric weight rotates about the second axis it produces a centrifugal force. Through each 180å of its motion, the resultant force will be at the 90å position, midway between the start and end positions and normal to the axis of rotation. At the same time, the weight is rotated about a perpendicular axis at the same speed, so that despite the fact that the rotation of the weight is continuous, its movement will in absolute terms be back and forth between two end points on one side of a single plane. Thus, the resultant centrifugal force generated by the weight will always be towards that side of the plane on which the weight is located. Altering the phase relationship between the rotation of the weight and that of the frame will alter the orientation of the resultant force.

BRIEF DESCRIPTION OF THE DRAWINGS

In the accompanying drawings, which illustrate exemplary embodiment of the present invention.

DETAILED DESCRIPTION

Figure 1:
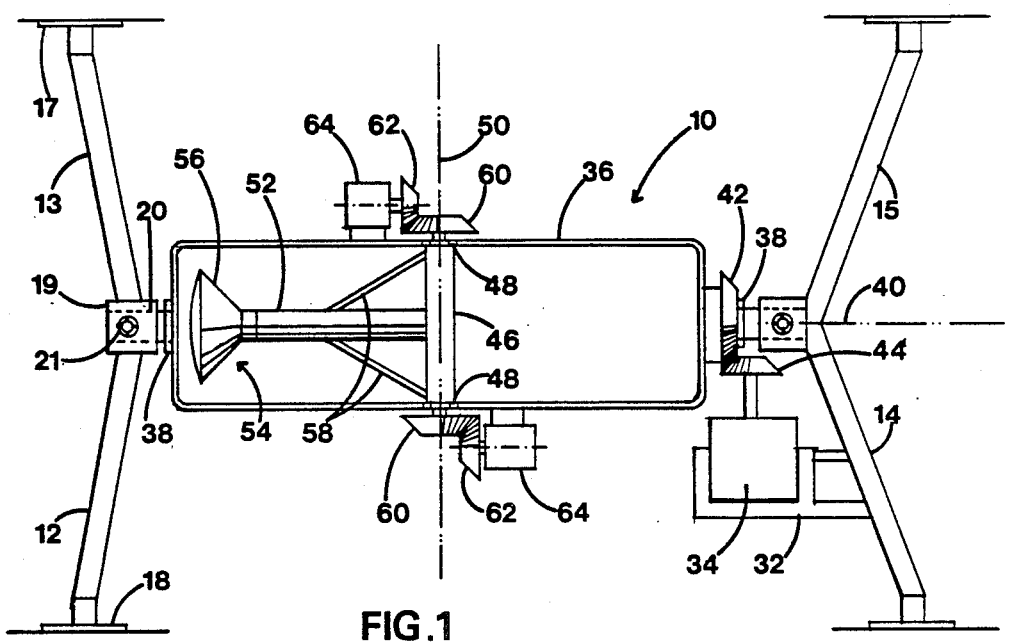
FIG. 1 is a side view of a device according to the present invention.
Figure 2:
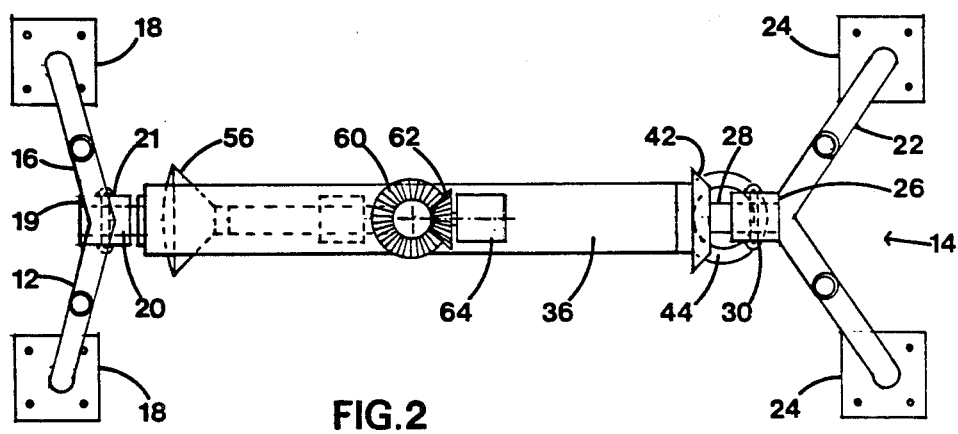
FIG. 2 is a plan view of the device of FIG. 1.
Figure 3:
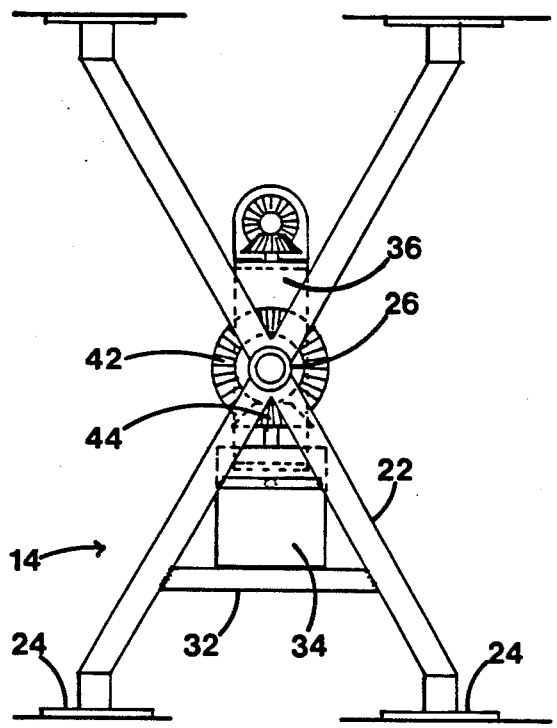
FIG. 3 is an end view of the device of FIG. 1.

Referring to the accompanying drawings, there is illustrated a motion converter 10 constructed according to the present invention. The converter includes two supports 12 and 14 on the left and right of the apparatus respectively as seen in FIGS. 1 and 2. The support 12 is an A-frame 16 mounted on square mounting plates 18. At the top of the A-frame 16 is a socket 19 carrying a stub shaft 20 that is held in place by set screws 21. The support 14 is an A-frame 22 with its legs secured to respective mounting plates 24. At the top of the A-frame 22 is a socket 26 of somewhat longer dimension than the socket 19. A stub shaft 28 is fitted into the socket 26 and is secured in place by set screws 30. The right hand support 14 also includes a motor support frame 32 carrying an electric motor 34 as shown most particularly in FIGS. 1 and 3.

Between the supports 12 and 14 is an elongate rectangular frame 36 carrying bearings 38 its at opposite so that the frame 36 may rotate about the axis 40. At its end adjacent the support 14, the frame 36 carries a bevel gear 42 that meshes with a bevel gear 44 mounted on the shaft of electric motor 34. The motor thus rotates the frame 36 about the axis 40.

The frame 36 carries a transverse shaft 46 that is mounted on the longitudinal sides of the frame by bearings 48 so that the shaft will rotate about an axis 50 perpendicular to the axis 40. A elongate arm 52 projects from the center of the shaft 46 and carries a weight 54 on its distal end. The weight 54 in this embodiment is a container 56 filled with mercury. Two angle braces 58 reinforce the connection of the arm 52 to the shaft 46. Each end of the shaft 46 is fixed to a bevel gear 60 that meshes with a bevel gear 62 driven by an electric motor 64. The motors 34 are mounted on the frame 36.

To operate the device, the motors 34 and 64 are operated at speeds selected to rotate the frame 36 and the weight 54 at the same speed and in phased syncronization. The motors 64 will rotate the weight 54 about the transverse axis 50, from the starting position illustrated in FIG. 1, through 180å to a position where the weight is located adjacent the right hand end of the frame 36. As will be apparent, the centrifugal force generated by the rotation of the weight 34 will produce a resultant force on the device frame, normal to the plane containing the shaft 46 and the end positions of the weight. During this rotation of the weight through 180å, the frame 36 itself is rotating through 180å so that at the end of the half cycle, the weight will be at the right hand side in FIGS. 1 and 2 and will be travelling upwards to return to the starting point through an arc above the horizontal plane containing the axis 40.

The net effect of this is that the centrifugal force that is generated by the rotating weight 54 will always have a component in the upwards direction, and will never have a component in the downwards direction. The resultant centrifugal force, if integrated over time, will be vertical, perpendicular to the horizontal plane containing axis 40.

While one embodiment of the present invention has been described in the foregoing, is to be understood that other embodiments are possible within the scope of the present invention. For example, the motors 64 rotating the weight 54 may be replaced with hydraulic cylinders or a magnetic arrangement of an appropriate source. The invention is thus to be considered limited solely by the scope of the appended claims.

I claim:
1. A device for obtaining a directional force from a rotary motion, comprising:
support means;
a frame;
means mounting the frame on the support means for rotation about a first axis;
first motor means mounted on the support means and operatively connected to the frame for rotating said frame about the first axis at a selected angular speed;
a shaft extending along a second axis perpendicular to the first axis;

bearings mounting the shaft for rotation on the frame;
a weight comprising a mass and an elongate arm extending from the mass to the shaft, the arm being secured to the shaft and being perpendicular to the second axis;
second motor means comprising two motors mounted on the frame and connected to opposite ends of the shaft for rotating said weight with respect to said frame about the second axis at said selected angular speed.

2. A device according to claim 1 wherein the support means comprises a pair of end supports with coaxial stub shafts, the frame comprising a pair of bearings engaging the stub shafts.

3. A device according to claim 1 including drive means connecting the first motor means to the frame.

4. A device according to claim 3 wherein said first motor means is an electrical motor.

5. An apparatus according to claim 1 wherein the weight comprises a container and mercury in the container.

6. A device for obtaining a directional force from a rotary motion, comprising:
two spaced apart end supports;
a frame;
means mounting the frame on the end supports for rotation about a first axis;
a motor mounted on one of the end supports;
a drive train connecting the motor to the frame for rotating the frame at a selected angular speed about the first axis;
a shaft mounted on the frame for rotation about a second axis perpendicular to and intersecting the first axis;
an elongate arm extending from the shaft, perpendicular thereto;
a mass carried by the elongate arm at a position remote from the shaft;
two motors mounted on the frame adjacent opposite ends of the shaft; and
drive trains connecting the motors to respective ends of the shaft for rotating the shaft about the second axis at the selected angular speed.

* * * * *